April 7, 1942.  G. D. SCOTT ET AL  2,279,250
RETRACTING MECHANISM FOR BORING TOOLS
Filed April 27, 1939
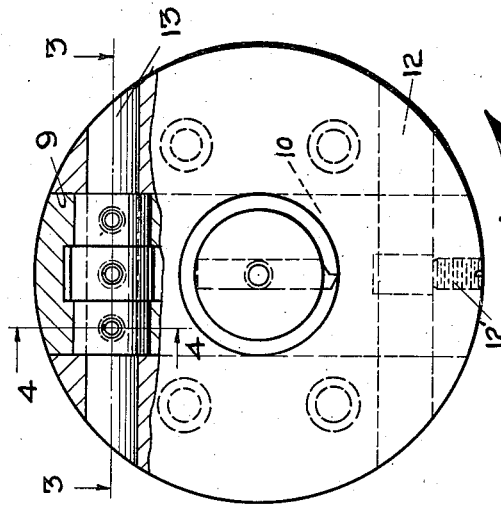
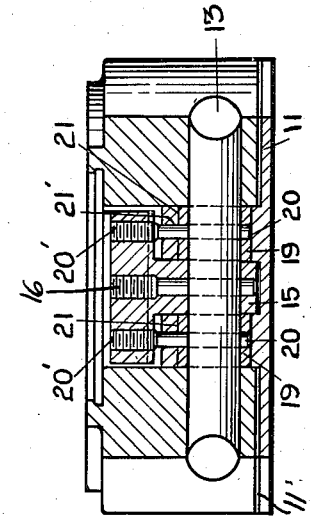
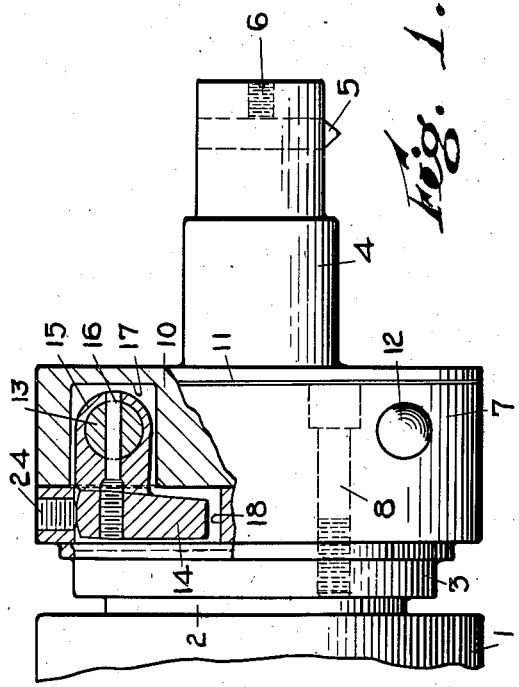
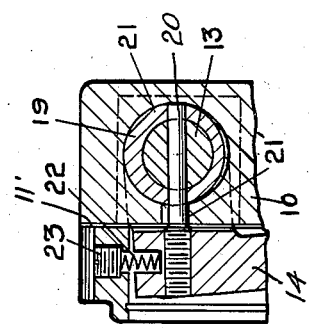
Inventors:
Gherald D. Scott
George H. Whittemore
Frank H. Glendon
By Geo. H. Kennedy Jr.
Attorney Patented Apr. 7, 1942

2,279,250

UNITED STATES PATENT OFFICE 2,279,250

RETRACTING MECHANISM FOR BORING TOOLS

Gherald D. Scott, George A. Whittemore, and Frank A. Glendon, Worcester, Mass., assignors to The Heald Machine Company, Worcester, Mass., a corporation of Massachusetts Application April 27, 1939, Serial No. 270,383

14 Claims. (Cl. 77—58)

The present invention relates to boring tools, and particularly to an arrangement for obtaining, in response to cessation of a boring tool's rotation, the retraction of the boring tool radially of its spindle axis at the end of each boring operation, thus to prevent any scoring of the finished workpiece bore on the ensuing withdrawal of the tool therefrom.

In the Schmidt Patent No. 2,058,359, dated October 20, 1936, is disclosed an arrangement which utilizes centrifugal force created by a boring tool's rotation to maintain, during each boring operation, the desired radial projection of said tool from its axis of rotation—the tool being retracted when, by the cessation of its rotation, said centrifugal force is no longer supplied. An object of the present invention is to utilize this same principle in a greatly simplified arrangement, involving a minimum number of parts to accomplish the desired results in a more certain manner.

The above and further objects and advantages of the invention will more fully appear from the following detailed description taken in connection with the accompanying drawing, in which—

Fig. 1 is a view in side elevation, partly in section, of mechanism in accordance with our invention, and showing the boring tool in working or operative position.

Fig. 2 is an end elevation of Fig. 1, with parts broken away.

Fig. 3 is a sectional view along the line 3—3 of Fig. 2.

Fig. 4 is a fragmentary large scale sectional view on the line 4—4 of Fig. 2, showing the parts as they appear in the retracted or non-working position of the boring tool.

Like reference characters refer to like parts in the different figures.

Our invention is readily applicable to any rotary tool spindle, for example, as shown in Fig. 1, the spindle 2 which is suitably journalled in a housing or mounting 1 and which carries on its projecting end a face plate 3 adapted to have attached thereto, as by bolts 8, 8, a circular head or shell 7 which, as hereinafter described, supports the tool-carrying and tool-retracting devices of our invention.

The boring tool is shown at 5, the same being held as by a set screw 6, so as to project radially from a spindle extension 4; the latter projects forwardly from a circular plate 11, from whose rear face projects a diametrically extending tongue 10 which fits in and is received by a diametrically extending slot 9 of the head or shell 7. The attachment of tool-carrying member 11 to the shell 7 is by means of a pivot shaft 12 to which the tongue 10 may be secured as by means of a set screw 12'; this pivot shaft 12 is suitably journalled in the shell 7 on an axis substantially at right angles to the spindle axis and radially offset therefrom. Thus the tool-carrying member 11 is constrained by said tongue and slot connection 9—10 to rotate with the spindle 2; however, said member 11, by reason of its slight spacing shown at 11', from the front face of shell 7, is capable of a limited rocking movement, about the axis of said pivot shaft 12.

On the other side of the spindle axis from the shaft 12 and in parallel relation to the shaft 12 is arranged a rod or shaft 13 which is suitably journalled at its end portions, like the shaft 12, in the cheeks of shell 7, on opposite sides of the latter's slot or recess 9. Around the central or intermediate portion of shaft 13, the tongue 10 is cut away to form a recess 17 which clears said shaft on all sides; this recess freely receives a lug member 15 secured to shaft 13 by a pin 16 and carrying, in offset relation to said shaft a weight 14 which is located in a recess 18 of the shell 7, behind the tongue 10. Said recess 18 is considerably wider than the recess 17, thus to accommodate a weight 14 which is considerably wider than its carrying lug 15, as shown in Fig. 3.

On opposite sides of the lug 15, as shown in Fig. 3, are eccentric sleeves 19 secured as by pins 20 to the shaft 13 and turnably received in bores 21 provided by portions of the tongue 10 on opposite sides of the latter's recess 17; by virtue of this arrangement, any slight rocking movement of the shaft 13 will so react on the tongue 10 as to give the plate 11 a slight rocking movement (permitted by the spacing 11') about the axis of the shaft 12, thereby providing for a slight movement of the point of the boring tool 5 toward or away from the axis of rotation of the spindle 2. The pins 20 are preferably integral with screws 20' threaded in the weight 14; for the passage of said pins 20, the adjacent portions of the tongue 10 provide the slots 21', which are slightly elongated as shown in Fig. 4, to permit the movement of said pins when the shaft 13 is rocked.

The weight 14, when the spindle 2 is at rest, is in the position of Fig. 4, being held in this position by spaced coil springs 22, Fig. 2, these springs being backed up by suitable threaded plugs 23, Fig. 4, positioned in an encircling portion of the shell 7. This position of the shell 7 between the plugs 23 provides a set screw 24, Fig.

1, adjustable in said shell 7 and engageable with the weight 14 when the latter moves outwardly from the axis of the spindle 2 as hereinafter described, under the influence of centrifugal force. The position of the set screw 24 determines the operative boring position of the tool 5 and this operative boring position may be accurately adjusted by adjustment of the set screw.

As above stated, the purpose of this mechanism is to obtain a slight inward displacement of the boring tool radially of its axis of rotation to withdraw the boring tool from operative position at the end of each boring operation and this withdrawal movement involves a slight rocking movement of the member 11 about its axis (the axis of the shaft 12). This movement of the member 11 shifts the cutting tool inwardly toward the axis of the spindle 2, the axis on which the tool is rotated. The mechanism also provides for an outward radial projection of the tool into operative position when the spindle is rotated.

When the spindle is at rest, the weight 14, by which the radial projection and retraction of the tool is obtained, is held by the springs 22 in the position of Fig. 4, and the tool is in retracted position. The eccentric sleeves 19 are positioned with the greatest eccentricity of the sleeves in a direction away from the axis of the spindle, as best shown in Fig. 4, in which the eccentricity is greatly exaggerated.

When the spindle is rotating, the centrifugal force exerted on the weight 14 causes it to move outwardly against the holding action of the springs 22, thereby turning the shaft 13 clockwise, Fig. 4, so that the eccentric sleeves act as cams to turn the member 11 about the axis of the shaft 12 through a very slight angle into the position shown by Fig. 1. This turning movement of the member 11 disposes the boring tool into the operative position of Fig. 1, and this operative position is limited by the set screw 24 which determines the outward swinging of the weight 14 and thus limits the effect of the weight on the member 11.

When the spindle is stopped, the springs 22 cause the weight 14 to move inwardly into the position of Fig. 4, thereby turning the shaft 13 counterclockwise, with a resultant counterclockwise rocking of member 11 on the axis of shaft 12, to retract the tool 5 slightly from its operative position. It will be understood that the opposite walls of the bores or slots 21 receiving the eccentric sleeves or cams 19, are spaced apart to correspond exactly with the diameter of the outer surface of each of the sleeves or cams 19, so that any turning movement of the shaft 13 will provide a corresponding turning of the member 11. With the arrangement of the parts shown, the angular turning movement of the member 11 will be extremely small and the effect will be a very small inward movement of the boring tool 5 toward its axis of rotation. An inward movement of one or two thousandths of an inch is sufficient to assure a satisfactory retraction of the tool and the mechanism shown will obviously provide at least this amount of retracting movement.

From the foregoing it will be apparent that the present invention provides very simple structure by which, upon a rotation of the boring spindle, the boring tool will be outwardly projected radially of its axis of rotation into operative position, this position being accurately determined by suitable limiting means, in this case, the set screw 24. Upon stopping of the spindle 2 the coil springs 22 become operative to move the weight 14 inwardly, thereby turning the eccentric sleeves 19 within the slots or bores 21 for retracting the boring tool from its operative position by a slight inward movement of the tool relative to its axis of rotation.

We claim:

1. In mechanism of the class described, a rotatably mounted spindle member, a tool carrying member carried by said spindle member and mounted for rocking movement relative to said spindle member on an axis substantially at right angles to the axis of the spindle member, and centrifugally actuated means carried by one of said members and connected to the other of said members, said means being moved in response to rotation of the spindle member for procuring a rocking movement of the carrying member to dispose the tool thereon in boring position.

2. In mechanism of the class described, a rotatably mounted spindle, a tool carrying member carried by said spindle and mounted for rocking movement relative to said spindle on an axis substantially at right angles to the axis of the spindle, centrifugally actuated means rotatable with said spindle and movable in response to rotation of the spindle for procuring a rocking movement of the carrying member to dispose the tool thereon in boring position, and means for limiting the movement of said centrifugally actuated means for determining the operative position of said tool.

3. In mechanism of the class described, a rotatable spindle, a tool carrying member mounted on said spindle for rotation therewith and for rocking movement relative thereto about an axis substantially at right angles to the spindle axis, a pivotally mounted weight having its pivotal axis spaced from the spindle axis and movable by centrifugal force when the spindle is rotated, and connections between said weight and the tool carrying member for moving the latter into operative position upon rotation of said spindle.

4. In mechanism of the class described, a rotatable spindle, a tool carrying member mounted on said spindle for rotation therewith and for rocking movement relative thereto about an axis substantially at right angles to the spindle axis, a pivotally mounted weight having its pivotal axis spaced from the spindle axis and movable by centrifugal force when the spindle is rotated, connections between said weight and the tool carrying member for procuring movement of the tool carrying member about its axis when said spindle is rotated, to dispose the tool thereon in boring position, and means for limiting the turning movement of the weight for determining the operative position of said tool.

5. In mechanism of the class described, a rotatable spindle, a tool carrying member connected to said spindle for rotation therewith and rockable on an axis substantially at right angles to the axis of the spindle, a pin carried by said spindle and adapted, by turning movement, to procure a movement of the tool carrying member about its axis, a cam on said pin and engageable with the tool carrying member to rock same on its axis by turning of the pin, and centrifugally actuated means movable in response to rotation of the spindle for turning said pin.

6. In mechanism of the class described, a rotatable spindle, a tool carrying member connected to said spindle for rotation therewith, and rockable on an axis substantially at right angles to the axis of the spindle, a pin carried by said spindle and adapted, by turning movement, to procure a movement of the tool carrying member about its axis, a cam on said pin and engageable with the tool carrying member to rock same on its axis by turning of the pin, and a weight connected to said pin and movable by centrifugal force resulting from the spindle rotation for turning said pin.

7. In mechanism of the class described, a rotatable spindle, a tool carrying member connected to said spindle for rotation therewith, and rockable on an axis substantially at right angles to the axis of the spindle, a pin carried by said spindle and adapted, by turning movement, to procure a movement of the tool carrying member about its axis, a cam on said pin and engageable with the tool carrying member to rock same on its axis by turning of the pin, a weight connected to said pin and movable by centrifugal force resulting from the spindle rotation for turning said pin, and means for limiting the movement of the weight to determine the operative position of a tool carried by said member.

8. In a mechanism of the class described, a rotatable spindle, a tool carrying member connected to said spindle for rotation therewith, and rockable on an axis substantially at right angles to the axis of the spindle, a pin carried by said spindle adapted, by turning movement, to procure a movement of the tool carrying member about its axis, a cam on said pin and engageable with the tool carrying member to rock same on its axis by turning of the pin, a weight connected to said pin and movable by centrifugal force resulting from the spindle rotation for turning said pin, thereby rocking said member to dispose a tool thereon in operative position, and resilient means for moving said weight in the opposite direction, thereby to rock said member for a retraction of said tool when said spindle comes to rest.

9. In mechanism of the class described, a rotatable spindle, a tool carrying member connected to said spindle for rotation therewith and rockable about an axis substantially at right angles to the axis of the spindle, a pin carried by said spindle and adapted, by turning movement, to procure a movement of the tool carrying member about its axis, a cam on said pin and engageable with the tool carrying member to rock same on its axis by turning of the pin, a weight connected to said pin and movable by centrifugal force resulting from the spindle rotation for turning said pin thereby to so rock said member as to project a tool thereon into operative position, resilient means engageable with the weight for moving said weight in the opposite direction, for rocking said member to retract said tool, and means for limiting the movement of the weight by centrifugal force to determine the operative position of said tool.

10. In mechanism of the class described, a rotatable spindle, a tool-carrying extension pivoted to said spindle on an axis substantially transverse to the spindle's axis of rotation, a tongue-and-slot connection between said parts, to insure their rotation in unison, a device carried by one of said parts and moved centrifugally, in response to the spindle's rotation, to force said extension about its pivot to a position which disposes a tool thereon in a predetermined operating position, and means including a spring for moving said extension to a tool-retracting position, upon cessation of said spindle's rotation.

11. In mechanism of the class described, a rotatable spindle an extension thereof pivoted thereto on an axis substantially transverse to the axis of rotation, a boring tool projecting radially from said extension in axially spaced relation to said pivotal axis, a device operatively associated with said spindle and said extension and movable centrifugally in response to rotation thereof to force said extension about its pivot to a position projecting said tool in an operative boring position, and means including a spring for moving said extension to a tool-retracting position, upon cessation of said spindle's rotation.

12. In mechanism of the class described, a rotatably mounted head, a tool-carrying member pivoted to said head and having a tongue-and-slot connection therewith, the opposing faces of said parts being slightly spaced to permit limited movement of said member on its pivotal axis, a device carried by one of said parts and moved centrifugally in response to their rotation to rock said member about its pivot to a position which projects a tool thereon in a predetermined operating position, and means including a spring for moving said member to a tool-retracting position, upon cessation of said spindle's rotation.

13. In mechanism of the class described, a rotatable spindle an extension thereof pivoted thereto on an axis substantially transverse to the axis of rotation, a boring tool projecting radially from said extension in axially spaced relation to said pivotal axis, a device pivoted to one of said parts on an axis on the opposite side of the spindle's axis from the pivotal axis of said extension, said device being movable centrifugally in response to the spindle's rotation, to force said extension about its pivot to a position projecting said tool in an operative boring position, and means including a spring for moving said extension to a tool-retracting position, upon cessation of said spindle's rotation.

14. In mechanism of the class described, a rotatable spindle, an extension thereof connected to rotate in unison therewith, a boring tool projecting radially from said extension, the latter being pivoted to said spindle for rocking movement about an axis substantially at right angles to the spindle axis, said pivotal axis being in a plane to which the projection of said tool is substantially perpendicular, and centrifugally actuated means movable in response to spindle rotation for rocking said extension about its pivotal axis to dispose said tool in operative boring position.

GHERALD D. SCOTT.
GEORGE A. WHITTEMORE.
FRANK A. GLENDON.